(12) United States Patent
Arms (10) Patent No.: US 11,769,090 B2
(45) Date of Patent: Sep. 26, 2023

(54) ELECTRONIC PROJECT MANAGEMENT SYSTEM

(71) Applicant: Marco Rayburn Arms, San Antonio, TX (US)

(72) Inventor: Marco Rayburn Arms, San Antonio, TX (US)

( * ) Notice: Subject to any disclaimer, the term of this patent is extended or adjusted under 35 U.S.C. 154(b) by 375 days.

(21) Appl. No.: 16/992,233

(22) Filed: Aug. 13, 2020

(65) Prior Publication Data

US 2022/0051155 A1 Feb. 17, 2022

(51) Int. Cl.
| | | |
|---|---|---|
| G06Q 10/06 | (2023.01) | |
| G06Q 10/0631 | (2023.01) | |
| G06F 16/635 | (2019.01) | |
| G01V 1/00 | (2006.01) | |
| G06F 16/65 | (2019.01) | |

(52) U.S. Cl.
CPC ....... *G06Q 10/06313* (2013.01); *G01V 1/001* (2013.01); *G06F 16/635* (2019.01); *G06F 16/65* (2019.01); *G06Q 10/063114* (2013.01)

(58) Field of Classification Search
CPC ...................................................... G06Q 10/06
See application file for complete search history.

(56) References Cited

U.S. PATENT DOCUMENTS

| | | | | |
|---|---|---|---|---|
| 10,048,973 | B1 * | 8/2018 | Barjatia | .............. H04R 19/04 |
| 2001/0043509 | A1 * | 11/2001 | Green | ................. E21B 47/107 |
| | | | | 367/81 |
| 2006/0158956 | A1 * | 7/2006 | Laugharn, Jr. | ......... B01J 19/008 |
| | | | | 366/127 |
| 2015/0219780 | A1 * | 8/2015 | Zeroug | .................. E21B 47/14 |
| | | | | 702/6 |
| 2019/0141449 | A1 * | 5/2019 | Barjatia | .................. H04S 7/301 |

FOREIGN PATENT DOCUMENTS

WO WO-2013026097 A1 * 2/2013 ..... G06Q 10/063114

OTHER PUBLICATIONS

Jeff Alford, Matt Blyth, Ed Tollefsen, John Crowe, Luanda, Angola, Julio Loreto, Saeed Mohammed, Vivian Pistre, Adrian Rodriguez-Herrera, Sonic Logging While Drilling—Shear Answers, Oilfield Review Spring 2012: 24, No. 1., Copyright © 2012 Schlumberger. (Year: 2012).*
U.S. Appl. No. 62/802,160, filed Feb. 6, 2019, Marco Rayburn Arms.
U.S. Appl. No. 16/784,169, filed Feb. 6, 2020, Marco Rayburn Arms.

* cited by examiner

*Primary Examiner* — Kurtis Gills
(74) *Attorney, Agent, or Firm* — BAKER BOTTS L.L.P.

(57) ABSTRACT

A system includes a memory configured to store a first acoustic profile associated with a device. The first acoustic profile includes at least two of the following acoustic characteristics: frequency, amplitude, and time. The system further includes a processor communicatively coupled to the memory and an acoustic sensor. The processor is configured to receive, from the acoustic sensor, an acoustic signal comprising one or more of the frequency and amplitude, compare the received acoustic signal to the first acoustic profile, and determine that the received acoustic signal matches the first acoustic profile based on the comparison of the received acoustic signal to the first acoustic profile.

19 Claims, 4 Drawing Sheets

| Crew | Worker | Tool | Project Site Address | Est. Nails for Project | Nails Fired | Nails Missed | Stage of Project | Est. Days to Finish | Deadline |
|---|---|---|---|---|---|---|---|---|---|
| 1 | Andrew | Nail Gun A | 1234 Westway | 6200 | 2580 | 70 | Shingles | 1 | 2 |
| 1 | Chase | Nail Gun B | 1234 Westway | 6200 | 2240 | 61 | Shingles | 1 | 2 |
| 2 | Paul | Nail Gun C | 4321 Ross | 8600 | 1654 | 42 | Plywood | 2 | 1 |
| 2 | Sean | Nail Gun D | 4321 Ross | 8600 | 900 | 85 | Plywood | 2 | 1 |

ELECTRONIC PROJECT MANAGEMENT SYSTEM

TECHNICAL FIELD

This disclosure generally relates to project management technology and, more specifically, to a system for acoustic monitoring of a project.

BACKGROUND

Project management is important for example, to maintain productivity, safety, budget, and deadlines. However, project management becomes increasingly difficult, and expensive, as the number of projects increases—particularly when projects are at different remote project sites. It can become impractical to manage many projects that may be at many different locations.

SUMMARY OF THE DISCLOSURE

According to embodiments of the present disclosure, disadvantages and problems associated with project management systems may be reduced or eliminated.

According to an embodiment, a system includes a memory configured to store a plurality of acoustic profiles associated with one or more operations of one or more devices, where the plurality of acoustic profiles include at least two of the following acoustic characteristics: frequency, amplitude, and time. The system further includes a processor communicatively coupled to the memory and an acoustic sensor. The processor is configured to: receive, from the acoustic sensor, a plurality of acoustic signals comprising one or more of the frequency and amplitude, where the acoustic sensor is one from the set comprising: communicatively coupled to a communication device (e.g., a mobile communication device) and integrated into a communications device; compare the received acoustic signals to one or more of the acoustic profiles; determine that the one or more of the received acoustic signals match one or more of the acoustic profiles based on the comparison of the received acoustic signals to the acoustic profiles; monitor a number of the received acoustic signals that are determined to match one or more of the acoustic profiles; monitor the progress of a project based at least in part on the monitored number of acoustic signals that are determined to match one or more of the acoustic profiles; and generate a report of the progress of a project based at least in part on the monitored number of acoustic signals that are determined to match one or more of the acoustic profiles, wherein the generated report is accessible from a communications device.

According to another embodiment, a system includes a memory configured to store a first acoustic profile associated with a device. The first acoustic profile includes at least two of the following acoustic characteristics: frequency, amplitude, and time. The system further includes a processor communicatively coupled to the memory and an acoustic sensor. The processor is configured to receive, from the acoustic sensor, an acoustic signal comprising one or more of the frequency and amplitude, compare the received acoustic signal to the first acoustic profile, and determine that the received acoustic signal matches the first acoustic profile based on the comparison of the received acoustic signal to the first acoustic profile.

The teachings of the disclosure provide one or more technical advantages or improvements. Embodiments of the disclosure may have none, some, or all these advantages or improvements.

One such advantage provided by one or more embodiments disclosed herein is increasing productivity by providing acoustic monitoring (e.g., real-time) of project activity and events.

Another such advantage provided by one or more embodiments disclosed herein is optimizing the supply chain by tracking supply usage through acoustic monitoring.

Yet another such advantage provided by one or more embodiments disclosed herein is facilitating project safety by detecting safety issues through acoustic monitoring and providing warnings to prevent potential accidents.

Further advantages provided by one or more embodiments include acoustic monitoring of employee performance including, for example, speed, safety, or efficiency.

Another advantage provided by one or more embodiments includes using acoustic monitoring of a project to predict when a project will be completed based on monitored activity.

Yet another advantage provided by one or more embodiments includes using acoustic monitoring in project scheduling (e.g., new and/or future projects) based on the monitored activity at an existing project.

Other objects, features, and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Project management can be difficult, particularly in situations where there are many projects at many different remote project sites. These problems can often occur in the context of construction projects.

For example, a roofing business may have a number of teams of employees that perform roof construction and/or repair at a number of different project sites. In an embodiment of the present disclosure, each team may deploy components of an acoustic monitoring system at each project site.

The acoustic monitoring system may include a processor, a memory, one or more acoustic sensors (e.g., microphone), and a communication device (e.g., a mobile communication device such as a smart phone, tablet, laptop computer, etc.). In certain embodiments, the acoustic monitoring system may be integrated within the communication device. The acoustic monitoring system may include a communication device communicatively coupled to one or more peripheral acoustic sensors. In particular embodiments, an acoustic sensor is a parabolic microphone.

The acoustic monitoring system may access acoustic profiles, stored in local or remote (e.g., cloud) memory, associated with one or more devices and/or one or more operations of the one or more devices. In an embodiment, an acoustic profile includes acoustic characteristics such as frequency, amplitude, or time. A processor of the acoustic monitoring system may compare one or more received acoustic signals from an acoustic sensor and compare the one or more received acoustic signals to one or more acoustic profiles to determine whether one or more of the received acoustic signal (s) match any acoustic profiles.

Acoustic profiles may be associated with particular devices, for example, in the case of roofing, a nail gun. Acoustic profiles may also be associated with second devices attached to first devices, for example, in the case of roofing, a muffler attached to a nail gun. In certain embodiments, a second device attached to a first device (e.g., a muffler attached to a nail gun) may have unique acoustic characteristics (e.g., an increased amplitude at a particular frequency). In particular embodiments, the unique acoustic characteristics of the second device may not be detectible by human hearing (e.g., an increased amplitude at a particular frequency, or frequency range, outside the range of human hearing, such as over 20,000 Hz).

Acoustic profiles may be associated with the operation of a particular device. For example, in the context of roofing, the sound of a nail shot from a nail gun going through plywood is different from the sound of a nail going through a shingle and plywood. Similarly, the sound of a nail going through plywood and a roof joist is different from the sound of a nail going through plywood and missing a roof joist.

The acoustic monitoring system may monitor progress at a project site by tracking the number of ambient sounds that match particular acoustic profiles. For example, in the context of roofing, a roofing project site may be associated with a particular roof square footage, number of plywood boards, amount of underlayment (e.g., tar paper), amount of insulation, number of shingles, and/or other amount of roofing material. The acoustic monitoring system may track progress at a project site, for example, by monitoring the sound of nails through the different roofing layers to track what layer is being applied and how much of each layer has been applied based on the number of nails used (e.g., as determined by matching ambient sound at the project site to one or more acoustic profiles).

Similarly, the acoustic monitoring system may monitor progress at a project site based on the type of device (e.g., tool, machine, or vehicle) being used. In an embodiment, different layers of a roof may involve different devices (e.g., nail guns, staplers, etc.). For example, a first type of nail gun may be used to affix plywood to roof joists, a power stapler may be used to affix tar paper and/or other materials to the plywood, and a second type of nail gun may be used to affix shingles. Each of these devices may have a different acoustic profile that can be monitored and used to track the progress of a project.

In another embodiment, a project involving cement work may be tracked based on what devices are being used. A jackhammer may indicate that the project is in an early stage and old concrete is being broken up. A dump truck (or the sound of debris landing in a dump truck) may indicate that the broken old concrete is being moved away. A cement mixer or cement truck may indicate that new cement is being poured, and a power trowel may indicate that the project is near completion.

In an embodiment, the acoustic monitoring system may be able to estimate an amount of time before completion of a project based on the monitored progress of the project. The acoustic monitoring system may receive, for example, weather forecast data, supply chain data, employee availability (e.g., scheduling) data, employee performance data, or other metrics to use in combination with the monitored progress of a project to estimate an amount of time to complete the project.

The acoustic monitoring system may generate one or more reports based on the monitored progress at one or more project sites. Reports may be accessed through a communication device, for example, through a website (e.g., URL address), application, or other program. The acoustic monitoring system may be configured to generate alerts, for example, if progress is behind an estimated schedule. This reporting allows a manager to simultaneously track (e.g., in real time) progress at many project sites without having to travel to the project sites, and allows the number of projects to scale much faster—or even independently—of the number of project managers. This scalability can be particularly important for businesses.

The acoustic monitoring system may also detect and prevent safety issues. For example, in the context of roofing, it is dangerous if a roofer is attempting to nail a plywood board to a roof joist but misses the joist with one or more nails because the unsecured plywood board could cause a roofer to fall. In an embodiment, the acoustic monitoring system may distinguish between the sound of a nail contacting plywood and a roof joist and the sound of a nail contacting plywood but missing the roof joist. The acoustic monitoring system may detect one or more nails (e.g., from the same nail gun) missing the roof joist and generate an alarm to notify workers so that an accident can be avoided and the board can be properly secured.

The acoustic monitoring system may associate particular acoustic profiles with individuals. For example, in the context of roofing, an employee on a roofing team may be assigned a particular nail gun or a particular muffler for a nail gun. The acoustic monitoring system may monitor the performance of individual team members based on acoustic profiles associated with the assigned device. In the context of roofing, for example, monitoring may be based on the number of nails used, the amount of nails contacting joists compared to the amount of nails missing joists, or other criteria. This information can be used to compensate employees such that those with better performance are better compensated or to staff projects, such as those with short deadlines, with more competent employees.

The disclosure above relies on roofing to explain exemplary embodiments of an acoustic monitoring system, however, the present disclosure is not limited to roofing and is more broadly applicable to the use of acoustic monitoring in project management, particularly of multiple projects at different project sites.

Embodiments of the present disclosure and its advantages are best understood by referring to FIGS. 1-4, with like numerals being used for like and corresponding parts of the various drawings.

Figure 1:
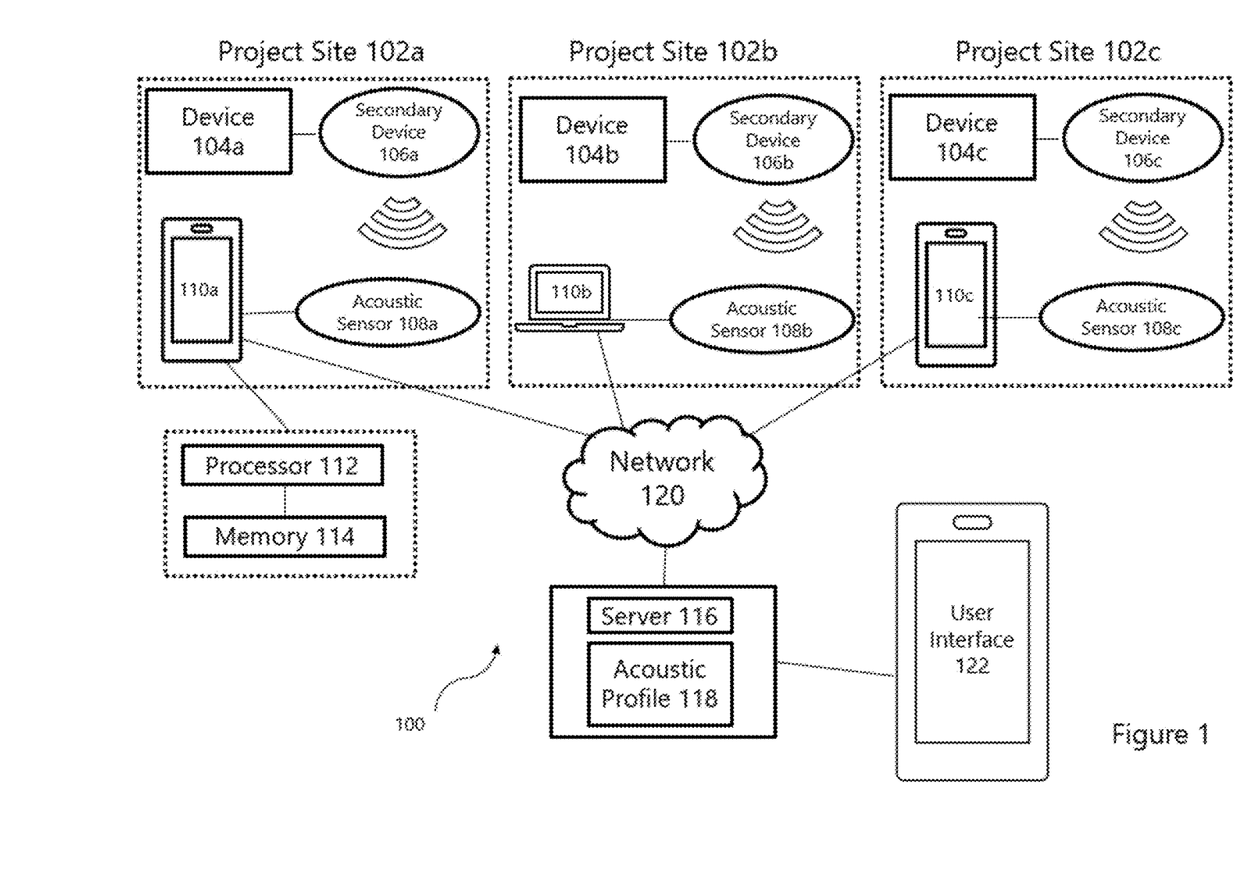
FIG. 1 illustrates an example acoustic monitoring system for project management.

FIG. 1 illustrates an example acoustic monitoring system for project management. In some embodiments, system 100 includes project sites 102, devices 104, secondary devices 106, acoustic sensors 108, communications devices 110, network 120, server 116, acoustic profile 118, and user interface 122.

System 100 may be configured to receive acoustic signals from acoustic sensors 108. Acoustic sensors 108 may detect ambient sound at project sites 102, including from devices 104 and/or secondary devices 106 attached to devices 104 that are located at project sites 102. An acoustic signal may comprise one or more of the frequency and amplitude of sound detected by acoustic sensors 108. Acoustic sensors 108 may be coupled to communications devices 110, including embedded within or peripheral to communication devices 110.

Communication devices 110 may be any type of portable electronic communication device, including smart phones, tablets, and laptop computers. In certain embodiments, communication devices 110 may communicate wirelessly, including using WiFi, cellular (e.g., 4G or 5G), satellite, or any other form of wireless communication.

Communication devices 110 may include processor 112 and memory 114. Processor 112 may include any suitable combination of hardware and software implemented in one or more modules to execute instructions and manipulate data to perform some or all of the described functions disclosed. In some embodiments, processor 112 may include, for example, one or more computers, one or more central processing units (CPUs), one or more microprocessors, one or more applications, one or more application specific integrated circuits (ASICs), one or more field programmable gate arrays (FPGAs), and/or other logic.

Memory 114 may comprise one or more non-transitory, tangible, computer-readable, and/or computer-executable storage media. Examples of memory 114 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other suitable other computer-readable storage medium or a combination of these devices. The software represents any suitable set of instructions, logic, or code embodied in a computer-readable storage medium. For example, the software may be embodied in memory 114, a disk, a CD, or a flash drive. In particular embodiments, the software may include an application executable by processor 112 to perform one or more of the functions described herein.

Memory 114 may store acoustic profiles. Processor 112 may compare received acoustic signals to stored acoustic profiles in memory 114 to determine whether received acoustic signals match stored acoustic profiles 118. Acoustic profiles 118 may comprise one or more of frequency, amplitude, and time, and may be associated with a device 104 or secondary device 106.

Server 116 may store acoustic profiles 118, either in addition or in alternative to storing acoustic profiles 118 at memory 114 of one or more communication devices 110. Communication devices 110 may transmit acoustic signals received from acoustic sensors 108 over network 120 to server 116. At server 116, the received acoustic signal may be compared to acoustic profile 118 to determine whether received acoustic signals match stored acoustic profiles 118.

Server 116 may receive acoustic monitoring data from communication devices 110. In certain embodiments, processor 204 of server 116 may receive acoustic signals from communication devices 110 and compare the received acoustic signals to acoustic profiles stored in memory 202 to determine if any received acoustic signals match any stored acoustic profiles. Server 116 may generate reports including monitored data from communication devices 110 at project sites 102. User interface 122 may receive from the server, the determination of whether the received acoustic signal matches acoustic profile 118 based on the comparison.

In some embodiments, devices 104a, 104b, and 104c, secondary devices 106a, 106b, and 106c, acoustic sensors 108a, 108b, and 108c, and communications devices 110a, 110b, and 110c may be located at project sites 102a, 102b, and 102c. Project sites 102a, 102b, and 102c may be construction sites, manufacturing sites, or any other project location.

System 100 may include devices 104. Devices 104 may comprise any one of devices, tools, or equipment found at project sites 102a, 102b, and 102c, respectively. Devices 104 may be, according to certain embodiments, construction equipment, manufacturing equipment, or any appropriate device that creates a detectable sound when used. For example, in some embodiments, devices 104a, 104b, and 104c may be tools, such as nail guns, jackhammers, saws, concrete mixers, trowel machines, vehicles (e.g., skid loader, excavator, crane, dump truck, etc.), and/or any other type of device.

In some embodiments, secondary devices 106a, 106b, and 106c may be communicatively coupled to devices, for example devices 104a, 104b, and/or 104c. Secondary devices 106a, 106b, and/or 106c may create sound in concert with device operation in some embodiments, and/or may be operable to modify the sound made by devices 104a, 104b, and/or 104c, respectively. Secondary devices 106 may emit sounds undetectable by humans (e.g., over 20,000 Hz) that may be detectable by sensors 108, in some embodiments. According to certain embodiments, secondary devices 106a, 106b, and 106c may be mufflers, such as a muffler that may be used on a nail gun. In a particular embodiment, secondary devices 106 may be mufflers for nail guns that reduce the sound of the nail gun in frequencies detectable by humans (e.g., 20-20,000 Hz) and generate a distinct characteristic (e.g., an increase in amplitude at a particular frequency or frequency range) at frequencies undetectable by humans (e.g., over 20,000 Hz).

System 100 may include one or more acoustic sensors, including acoustic sensors 108a-c, collectively acoustic sensors 108. Acoustic sensors 108 may be configured to detect sound and generate a signal (e.g., acoustic signal) associated with the detected sound. In some embodiments acoustic sensors 108 may be microphones or parabolic microphones. In some embodiments, acoustic sensors 108a, 108b, and/or 108c may be communicatively coupled (e.g., as a peripheral) to communications devices 110a, 110b, and/or 110c, respectively. In certain embodiments, acoustic sensors 108a, 108b, and/or 108c may be integrated into communications devices 110a, 110b, and/or 110c, respectively.

In some embodiments, communications devices 110a-c, collectively communications devices 110, may be any appropriate devices for communicating with components of system 100 over network 120 to facilitate a transmission. For example, communications devices 110 may be a wireless or cellular telephone, a computer, a laptop, a tablet, and/or an automated assistant. Communications devices 110a-c may be GPS-enabled, in some embodiments, so that a GPS signal may be used to mark the locations of one or more of communications devices 110a, 110b, and/or 110c. Communication devices 110 may be operable to connect to the Internet and may be able to receive data from server 116 (e.g., supply chain data, employee schedule data, employee performance data, or other relevant date) or from the Internet (e.g., weather data). According to certain embodiments, an application executed by one or more of communications devices 110 may perform some of the functions described herein. Communications devices 110 may connect to network 120.

Network 120 facilitates communication between and amongst the various components of system 100. This disclosure contemplates network 120 being any suitable network operable to facilitate communication between the components of system 100. Network 120 may include any interconnecting system capable of transmitting audio video signals data, messages, or any combination of the preceding. Network 120 may include all or a portion of a public switched telephone network (PTSN), a public or private data network, a local area network (LAN), a metropolitan area network (MAN), a wide area network (WAN), a local, regional, or global communication or computer network such as the internet, a wireline, or a wireless network, an enterprise internet or any other suitable communication link including combinations thereof operable to facilitate communication between the components.

Network 120 may be connected to server 116, in some embodiments. Server 116 may include one or more computer processors, memory units, and input/output units. Server 116, in some embodiments, may have one or more acoustic profile 118 stored in a memory unit. According to certain embodiments, acoustic profile 118 may be associated with one or more pieces of devices 104a, 104b, and/or 104c, an operation of devices 104, and/or a device 104a, 104b, and/or 104c associated with an individual worker. Acoustic profile 118 may comprise at least two of the following acoustic characteristics: frequency, amplitude, and time, in some embodiments. According to particular embodiments, acoustic profile 118 may include acoustic characteristics of acoustic sensors 108a, 108b, and 108c coupled to devices 104a, 104b, and 104c, respectively. Server 116 and acoustic profile 118 will be explained further below in reference to FIGS. 2, 3, and 4. Server 116 may communicate with user interface 122

System 100 may further include user interface 122, according to some embodiments. User interface 122 may comprise hardware and/or software. In some embodiments, user interface 122 may receive input (e.g., sensory data or system data), send output (e.g., instructions), process the input and/or output, and/or perform any other suitable operation. According to certain embodiments, an application executed user interface 122 may perform some of the functions described herein. In some embodiments, user interface 122 may output one or more alarms (e.g., audio, visual, or tactile alarms) in response to alarm signals. According to particular embodiments, user interface may display an alarm signal in response to a processor determining that one or more acoustic signals match an operation of devices 104. For instance, in some embodiments, an alarm signal may be generated at user interface 122 when a processor of server 116 determines, based on an acoustic signal, that devices 104a, such as a nail gun, has fired but has missed a roof joist underlying a piece of plywood. An alarm signal and/or alarm may further identify an individual subject to the alarm (e.g., the employee assigned to the nail gun that missed the roof joist). In some embodiments, an alarm signal may be generated after a number of consecutive misses exceeds a threshold value. The alarm signal may be generated in such a way that it will be detected, for example, by employees and/or a supervisor of the project site 102 where the device operation triggering the alarm signal is located and/or by the user of the device itself. In some embodiments, the alarm signal may be generated on a display of user interface 122. For instance, the alarm signal may be at least one of an audible alarm signal emanating from user interface 122, a visual indicator on a display of user interface 122, and/or a tactile alarm signal. In certain embodiments, the alarm signal may comprise one or more of a text message, an email, a push alarm signal, and/or a paging message at user interface 122. A visual indicator may include, for example, at least one of the following: flashing colors, bold, font change, animation, flashing numbers, flashing lights, or some other appropriate type of indicator. The audible alarm signal may include, for example, without limitation, a tone, a verbal message, or some other appropriate type of audible alarm signal. A tactile alarm signal can be, for example, without limitation, a command that transmits to user interface 122 that is configured to cause user interface 122 and/or the involved device to vibrate in response to receiving a signal to generate an alarm signal. In particular embodiments, an alarm signal may disable a device 104 associated with the alarm signal, for example, a nail gun that has missed a roof joist. The alarm signal may include a variety of information and may take a variety of forms, both of which may vary depending on particular implementation. In some embodiments, a report generated by a processor at server 116 may be accessible at user interface 122. The report may, in some embodiments, display the number of acoustic signals that are determined to match an operation of one or more devices 104.

Although this disclosure describes and illustrates a particular user interface, this disclosure contemplates any suitable interface. For example, user interface 122 may include the user interfaces of mobile devices (i.e., any suitable portable hardware, including appropriate controlling logic and data, capable of communicating with remote devices) including, but not limited to, mobile telephones, advanced ("smart") phones, personal digital assistants (PDAs), wireless handsets, notebook computer systems, and tablet computer systems. According to particular embodiments, user interface 122 may include the user interface wireless devices with advanced user interfaces, such as the APPLE iPhone, iPod Touch, or iPad, or devices using Google Android.

In operation, system 100 may be configured to measure, at acoustic sensors 108, one or more of the frequency and amplitude of a sound generated by devices 104 and/or devices 106. For example, in some embodiments, devices 104a may be a nail gun that shoots nails into plywood for a roofing project being conducted at project site 102a. In this example, secondary device 106a may be a muffler on the nail gun that emits a sound, which may be detected by acoustic sensor 108a that is a peripheral microphone on a cell phone. In some embodiments, the acoustic signal representing the sound of one or more fired nails from devices 104a and/or secondary device 106a is communicated from communications device 110a, via network 120, to server 116, where it may be compared with at least one acoustic profile 118. Received acoustic signals may be compared to acoustic profiles for at least: a plurality of types of devices, a plurality of devices of a certain type, and/or a plurality of operations for a device. The operation of the device in the acoustic profile may be the sound of a nail gun shooting a nail, and may be the sound of a nail gun shooting a nail into a particular material, in certain embodiments. According to particular embodiments, the operation of the device may be related to a safety problem, such as whether a nail gun is firing nails so that they safely attach a piece of plywood to a roof joist without creating a risk that the plywood will slide down the roof. In some embodiments, a processor may determine that the received acoustic signal matches at least one acoustic profile 118. The processor may also monitor the number of acoustic signals that match at least one acoustic profile 118. For example, in some embodiments, acoustic profile 118 may match with an acoustic signal for a nail gun shooting a nail through a piece of plywood and into a roof joist. In this manner, system 100 may match one or more acoustic signals with one or more acoustic profiles and may determine whether the fired nails are attaching the piece of plywood to the roof joist, according to certain embodiments. In some embodiments, system 100 may determine the number of nails that hit and/or do not hit the roof joist. In response to making a determination of matching between one or more acoustic signals and one or more acoustic profiles, information may be sent to user device 122, in some embodiments. According to certain embodiments, a processor at server 116 may be configured to generate an alarm signal in response to determining that one or more acoustic signals match an operation of a device. For instance, an alarm may be generated if a nail fired by a nail gun into plywood does not hit a roof joist, or if several consecutively fired nails do not hit a roof joist. In this manner, a supervisor at user interface 122 may be alerted to the fact that a piece of plywood may not be securely attached, in some embodiments. In certain embodiments, a memory is configured to store a user associated with each of devices 104a, 104b, and 104c. Secondary devices 106a, 106b, and 106c may emit distinct acoustic signals, in some embodiments, so that a processor at server 116 may match the operation of each of devices 104a, 104b, and 104c, respectively, with particular individuals. In some embodiments, a stage of construction may be determined based on whether an acoustic signal matches an acoustic profile 118 for an operation associated with a certain type of material, such as, for example, roofing plywood or roofing shingles. In this manner, project site progress and/or activities may be monitored in real time using ambient sound, according to certain embodiments. More features of the operation of various embodiments of system 100 will be further explained below in reference to FIGS. 2, 3, and 4.

Modifications, additions, or omissions may be made to the systems described herein without departing from the scope of the invention. The components may be integrated or separated. While the disclosure above describes a particular embodiment of system 100, one of skill in the art would appreciate that many changes could be made to the assembly and still be within the scope of the present disclosure. For example, although this disclosure may discuss a roofing embodiment, it is contemplated that system 100 may be used in connection with other projects, including other construction projects. For example, system 100 may be used, for example, in connection with other construction projects including building a house (e.g., framing), laying concrete, road construction, steel construction (e.g., commercial buildings), earth moving, pipe laying, mechanic shops, and in connection with manufacturing projects including assembly lines. Moreover, the operations may be performed by more, fewer, or other components. For instance, although FIG. 1 depicts a single acoustic profile 118, server 116 may store any number of acoustic profiles. Moreover, the operations may be performed by more, fewer, or other components.

Figure 2:
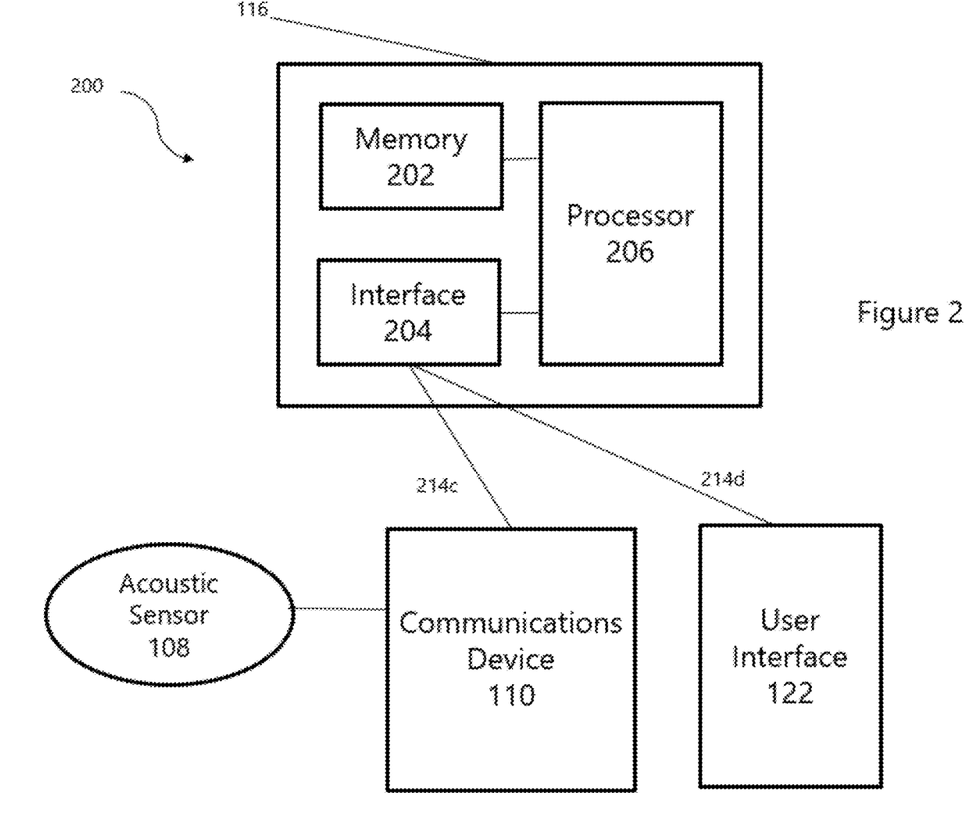
FIG. 2 illustrates an example components of an acoustic monitoring system, where particular embodiments of the disclosure may be implemented.

FIG. 2 illustrates an example components of an acoustic monitoring system, where particular embodiments of the disclosure may be implemented. According to certain embodiments of the present disclosure, server 116 of FIG. 1 may be or comprise system 200. System 200 may comprise memory 202, one or more interfaces 204, one or more processors 206, communications device 110, acoustic sensor 108, and user interface 122. The components of system 200 may be connected via logical connections 214. Although this disclosure describes and illustrates a particular system 200 having a particular number of particular components in a particular arrangement, this disclosure contemplates the system 200 having any suitable number of any suitable components in any suitable arrangement.

Memory (or memory unit) 202 may store, either permanently or temporarily, data, operational software, or other information for processor 206. As an example, a memory may store one or more acoustic profiles, such as acoustic profile 118 of FIG. 1, that may be associated with one or more types of devices, one or more devices of a type, and/or one or more operations for at least one of the types of devices or devices. In some embodiments, memory 202 may store a physical project site location associated with each of a first device, a second device, and a third device.

Memory 202 may comprise one or more non-transitory, tangible, computer-readable, and/or computer-executable storage media. Examples of memory 202 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other suitable other computer-readable storage medium or a combination of these devices. The software represents any suitable set of instructions, logic, or code embodied in a computer-readable storage medium. For example, the software may be embodied in memory 202, a disk, a CD, or a flash drive. In particular embodiments, the software may include an application executable by processor 206 to perform one or more of the functions described herein.

Interface 204 represents any suitable device operable to receive information from network 120, transmit information through network 120, communicate with other devices, or any combination of the preceding. Interface 204 may represent any port or connection, real or virtual, including any suitable hardware and/or software, including protocol conversion and data processing capabilities, to communicate through a LAN, WAN, or other communication system that allows processor 206 to exchange information with communications devices 110, network 120, or other components of system 100. Interface 204 receives input (e.g., sensor data or system data), sends output (e.g., instructions), processes the input and/or output, and/or performs other suitable operation. In certain embodiments, interface 204 may be communicatively coupled via, for example, logical connections 214b and 214c, to a processor, for example processor 206, and one or more communications devices 110 that may be located at the one or more project sites 102 of FIG. 1.

Interface 204 may receive an acoustic signal associated with a device 104 of FIG. 1, in some embodiments. In certain embodiments, interface 204 may receive weather forecast data, supply chain data, employee schedule data, employee performance data, and/or any other type of data that processor 206 may use to estimate time of project completion. According to particular embodiments, interface 204 may receive a determination that the received acoustic signal matches an acoustic profile based on the comparison of the received acoustic signal to the acoustic profile from processor 206 and may send the data to user interface 122 for display. Interface 204 may send an alarm to user interface 122, according to certain embodiments. In some embodiments, interface 204 may be configured to transmit an alarm and/or a kill signal (e.g., a signal to stop operation) to the one or more devices, for example devices 104a, 104b, and/or 104c of FIG. 1. Interface 204 may include one or more interfaces 204, where appropriate. Although this disclosure describes and illustrates a particular interface, this disclosure contemplates any suitable interface.

In some embodiments, processor 206 may be communicatively coupled, via, for example, logical connection 214, to one or more components of system 200, including memory 202 and interface 204. Processor 206 may include any suitable combination of hardware and software implemented in one or more modules to execute instructions and manipulate data to perform some or all of the described functions disclosed. In some embodiments, processor 206 may include, for example, one or more computers, one or more central processing units (CPUs), one or more microprocessors, one or more applications, one or more application specific integrated circuits (ASICs), one or more field programmable gate arrays (FPGAs), and/or other logic.

As an example, processor 206 may be configured to: receive, from a communications device with an acoustic sensor, for example communications device 110 with acoustic sensor 108, an acoustic signal comprising one or more of frequency and amplitude of detected sound; compare the received acoustic signal to one or more acoustic profiles stored in memory 202, such as acoustic profile 118 of FIG. 1; determine that the received acoustic signal matches an acoustic profile based on the comparison to one or more of the acoustic profiles; and generate a signal that may, in some embodiments, be displayed on user interface 122. In some embodiments, processor 206 may be further configured to receive one or more acoustic signals and monitor the number of acoustic signals that are determined to match at least one of the acoustic profiles from at least: a plurality of devices, such as devices 104, and/or a plurality of operations for at least one of the plurality of devices, such as devices 104a, 104b, and/or 104c. Processor 206 may also, in some embodiments, monitor the progress of a construction project and/or estimate an amount of time to complete a construction project based at least in part on the monitored number of acoustic signals that are determined to match an operation of a device, for example device 104a on project site 102a. Processor 206 may, in some embodiments, generate a kill signal instructing one or more devices, such as devices 104a, 104b, and/or 104c, to turn off. According to particular embodiments, processor 206 may generate an alarm signal and/or a kill signal in response to determining one or more acoustic signals match an operation of a device 104. An alarm signal and/or a kill signal may be generated, in some embodiments, in response to a determination by processor 206 that the number of received signals that match an acoustic profile is above a threshold. In some embodiments, processor 206 may generate a report of the number of acoustic signals that are determined to match an operation of one or more devices. The report may be generated by the processor in real time, according to particular embodiments. In certain embodiments, the processor may associate the monitored number of acoustic signals that are determined to match an operation of one or more devices with one or more individuals. Processor 206 may receive weather forecast data, supply chain data, employee schedule data, employee performance data, and/or any other type of data useful to estimate time of project completion and determine an estimation of the amount of time to complete the construction project based at least in part on some or all of the data, according to some embodiments. As still another example, processor 206 estimate an amount of inventory consumed based at least in part on the determination that the received acoustic signal matches an acoustic profile based on the comparison of the received acoustic signal and an acoustic profile which may be associated with an operation of one or more devices.

Modifications, additions, or omissions may be made to the systems described herein without departing from the scope of the invention. For example, system 200 may include any number of processors 206, memory units 202, and/or interfaces 204. The components may be integrated or separated. Moreover, the operations may be performed by more, fewer, or other components. System 200 may be located on a single server or may be distributed over a plurality of computer systems and networks.

Figure 3:
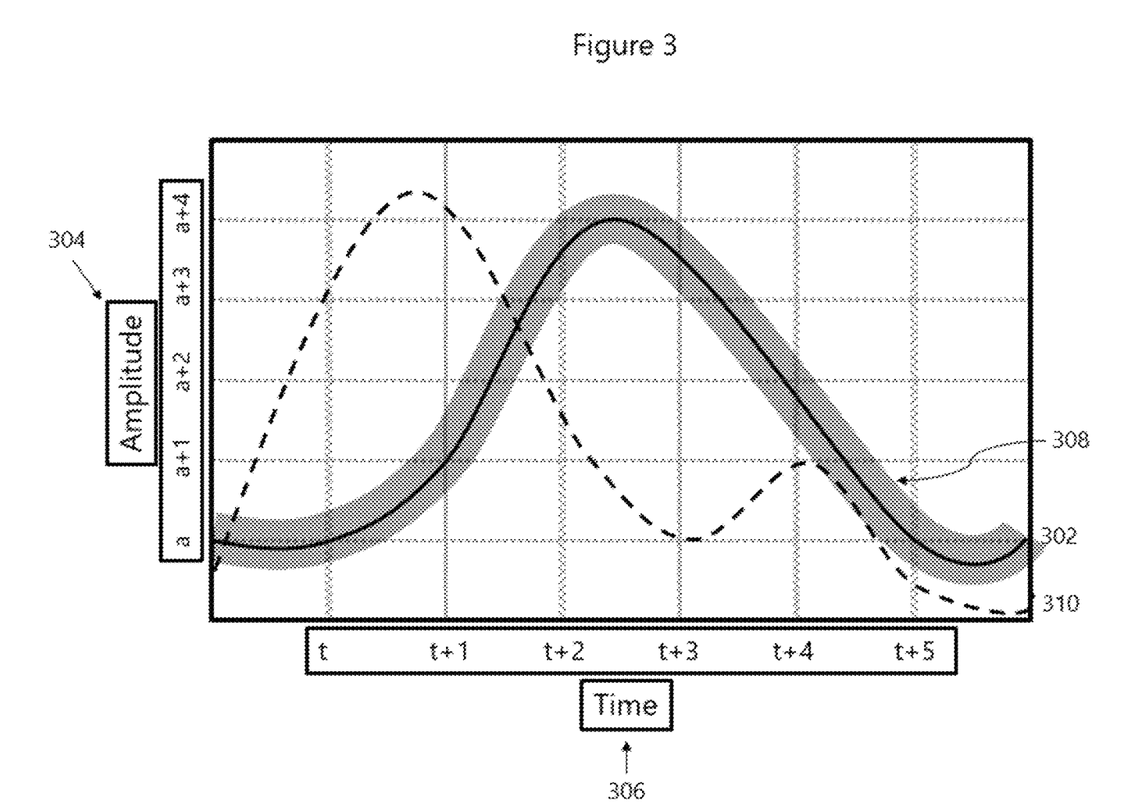
FIG. 3 illustrates an example comparison of an acoustic profile with an acoustic signal.

FIG. 3 illustrates a comparison of acoustic profile 302 with acoustic signal 310. According to certain embodiments, acoustic profile may comprise one or more of the following acoustic characteristics: frequency, amplitude, and time. In some embodiments, acoustic profile 302 may be a function of amplitude 304 of a particular frequency, or frequency range, over time 306.

According to particular embodiments, acoustic profile 302 includes acoustic characteristics of a device, such as devices 104a, 104b, and/or 104c, and/or secondary devices 106a, 106b, and/or 106c, respectively. Acoustic profile 302 may include acoustic characteristics of a particular operation of a device 104 and/or secondary device 106. For example, in the context of roofing, system 100 may include acoustic profiles for different nail guns, different mufflers, nails contacting plywood but not roof joists, nails contacting plywood and a roof joist, nails contacting shingles, or other operation of a device 104 and/or secondary device 106. In certain embodiments, acoustic profile 302 include tolerances, or buffers (illustrated in the example of FIG. 3 by the gray area 308).

FIG. 3 also includes acoustic signal 310. Acoustic signal 310 may represent the output of an acoustic sensor 108 detecting ambient sounds. In certain embodiments, acoustic signal 310 may represent one or more acoustic filters and/or amplifiers applied to ambient sound detected by an acoustic sensor 108. Ambient sounds may include sounds generated by devices 104 and/or secondary devices 106 operating at a project site such as project site 102 of FIG. 1.

As discussed above, an acoustic sensor, for example acoustic sensor 108 of FIG. 1, may detect ambient sound and generate acoustic signal 310. A processor, for example processor 112 of FIG. 1 or processor 206 of FIG. 2, may receive acoustic signal 310 from acoustic sensor 108. According to certain embodiments, the processor (e.g., processor 112 or 206) may also be communicatively coupled to a memory, such as memory 114 of FIG. 1 or memory 202 of FIG. 2, may compare acoustic signal 310 to acoustic profile 302, and may determine that acoustic signal 310 matches acoustic profile 302.

For example, in particular embodiments, the processor may determine that an acoustic signal falls within area 308, which may form an upper and lower bound around acoustic profile 302, thus indicating a match. In some embodiments, a processor may determine that an acoustic signal falls outside area 308, as illustrated with respect to acoustic signal 312, thus indicating no match.

Modifications, additions, or omissions may be made to the systems described herein without departing from the scope of the invention. For example, a memory may be configured to store more than one acoustic profile associated with an operation of a device.

Figure 4:
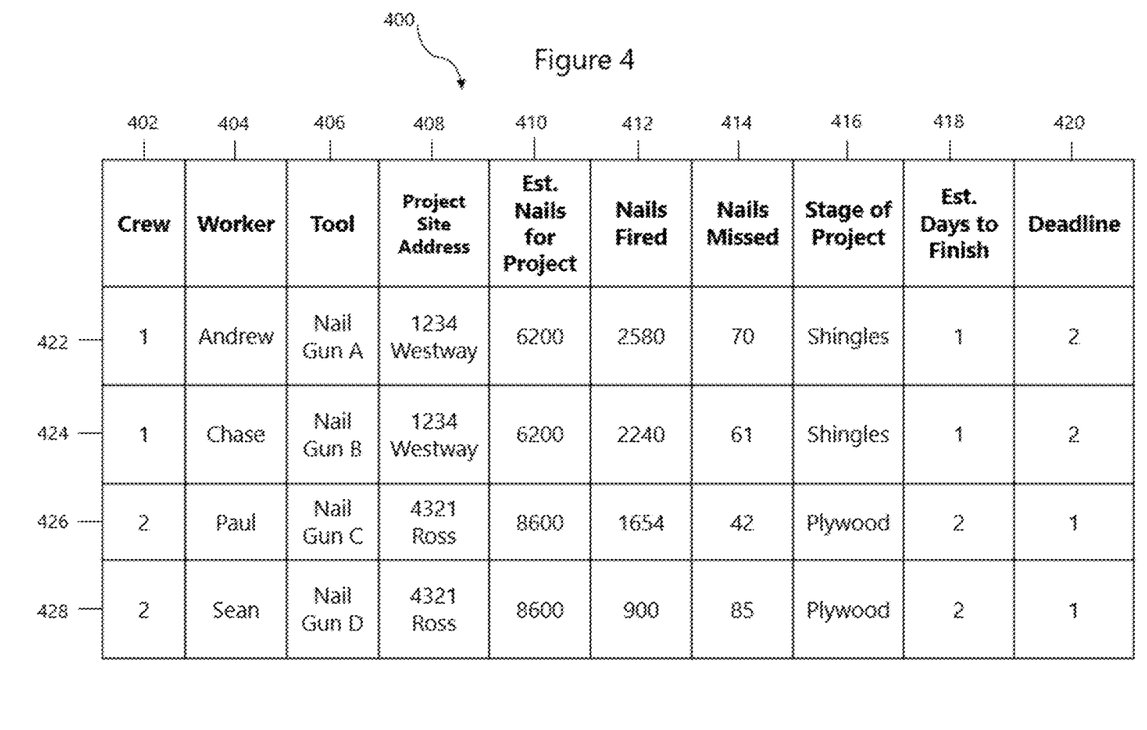
FIG. 4 illustrates an example of a table for particular embodiments of the disclosure.

FIG. 4 illustrates an example table 400 for particular embodiments of the disclosure, which includes exemplary data that may be generated as part of a report. Table 400 may, in some embodiments, facilitate individual-level tracking and/or project-site tracking and reporting to a project-site supervisor. According to some embodiments, a processor (e.g., processor 112 or 206) may monitor the progress of a construction project at one or more project sites and/or the activities of individual workers and/or work crews, based at least in part on the number of acoustic signals that are determined to match an acoustic profile associated with an operation of a device, such as nails fired from a nail gun. As illustrated, in some embodiments, the processor may generate a report in real time or near real time (collectively referred to as "real time"). The report may be stored and may be accessed by remote devices, such as user interface 122 of FIG. 1, in some embodiments.

Table 400, as illustrated, includes crew column 402, worker column 404, tool column 406, project site address column 408, estimated nails for project column 410, nails fired column 412, nails missed column 414, stage of project column 416, estimated days to finish column 418, and deadline column 420. Columns 402 to 420 may, in some embodiments, represent the data that may be stored. Column 402 may represent, with an identifier (e.g., a numerical identifier as illustrated, an alphabetical identifier, or any other identifier), the crew that is working on a given project site, in some embodiments. Column 404 may represent, according to some embodiments, the worker to whom a device may be assigned. Column 406 may represent with an identifier (e.g., an alphabetical identifier as illustrated, a numerical identifier, or any other identifier), the tool that a given worker is using for a certain time period (e.g., a day, the duration of a project, or any other time period). Column 408 may represent the location of the project site, such as an address, in certain embodiments. Column 410 may represent the estimated number of nails that may be used during a given project, in some embodiments. This estimation may be calculated based on the square footage of the roof and the estimated number of nails per square foot, in some embodiments, and/or the square footage of the roof and the estimated number of nails used per roofing component (e.g., per shingle, per piece of plywood, and/or per length of tar paper). According to certain embodiments, column 412 may represent an amount of inventory consumed, for example the number of nails fired as illustrated, during a given time period (e.g., from the beginning of the project to the current time). This determination may be based at least in part on a determination by a processor that the received acoustic signal matches an acoustic profile for an operation of a device, based on the comparison of the received acoustic signal to the second acoustic profile. Column 414 may represent, in some embodiments, the number of nails fired that miss an intended target (e.g., a roof joist). In some embodiments, this data may be related to safety features, such as alarms or device kill switches when the number of nails missed exceeds a threshold value, to notify workers and/or supervisors that a piece of plywood may not be securely attached to the roof joists so that actions can be taken to prevent the plywood from sliding down the roof and injuring people. Column 416 may represent the stage of the project, in some embodiments. According to certain embodiments, a processor may estimate the stage of the job by determining that the received acoustic signal matches an acoustic profile for an operation of a device through a certain material (e.g., tar paper, shingles, and/or plywood), based on the comparison of the received acoustic signal to the second acoustic profile. Column 418 may represent, in some embodiments, an estimation of the amount of time to complete a project. In certain embodiments, the estimated completion period may be calculated based, at least in part, on the monitored number of acoustic signals that are determined to match the operation of a device (e.g., firing a nail gun), the square footage of the roof at the project site, and the estimated number of nails for the project. An estimation of completion, in some embodiments, may also be determined based on a set of data including, at least: weather forecast data, supply chain data, worker schedule data, and worker performance data. The time period displayed may be one of days, as illustrated, hours, or any other time period during which measurements may be collected at the project site. Column 420 may represent, in some embodiments, the deadline by which the project should be completed. This may be based on an estimation of completion time at the beginning of the project, in some embodiments.

With respect to some embodiments, a processor may be configured to associate the monitored number of acoustic signals that are determined to match an operation of a device, such as the nails fired from a nail gun in certain embodiments, with an individual. As illustrated, the rows of table 400 may be identified according to individual workers, for example Andrew in row 422, Chase in row 424, Paul in row 426, and Sean in row 428, in some embodiments.

Rows 422 and 424 show an example of information relating to a project occurring at a project site, such as a roofing project occurring at the address 1234 Westway as illustrated. In the illustrated example, work at the project site is being performed by two workers in crew 1: Andrew in row 422 and Chase in row 424. Of the 6200 estimated nails for the project, Andrew has 70 nails missed out of 2580 nails fired from nail gun A, and Chase has 61 nails missed out of 2240 nails fired from nail gun B. Furthermore, the example report in table 400 shows that the project is at the shingles stage, the project is estimated to finish in one day, and the deadline for project completion is in two days. In this example, supervisors or users of a user interface on which table 400 may be displayed may see, with data provided in real-time, that the two workers have comparable capabilities, that the job has progressed to a stage of near completion, and that the project is estimated to be completed one day before the deadline. The use of deadline data and estimated completion date can show that a project is ahead of or behind schedule, and a supervisor may use this data to forecast the availability of project crews and decide if additional projects may be accepted. For instance, because the tracked data in table 400 shows that the project in this example is ahead of schedule, the supervisor in this example would know and could take advantage of the fact that crew 1 (Andrew and Chase) would be available to begin another project one day earlier than originally anticipated.

Rows 426 and 428 show an example of information relating to a project occurring at a project site, such as a roofing project occurring at the address 4321 Ross as illustrated. In the illustrated example, work at the project site is being performed by two workers in crew 2: Paul in row 426 and Sean in row 428. Of the 8600 estimated nails for the project, Paul has 42 nails missed out of 1654 nails fired from nail gun C, and Sean has 85 nails missed out of 900 nails fired from nail gun D. Furthermore, the example report in table 400 shows that the project is at the plywood stage, the project is estimated to finish in two days, and the deadline for project completion is in one day. In this example, supervisors or users of a user interface on which table 400 may be displayed may see, with data provided in real-time, that Paul is much more productive than Sean both in terms of number of nails fired and in hit percentage, that the job is still in the beginning stage of plywood installation rather than shingle installation, and that the project is estimated to be completed one day after the deadline. Because the tracked data in table 400 shows that the project for rows 426 and 428 may be behind schedule, the supervisor may know to assign additional staffing to the project site to complete the project by the deadline. Table 400, in some embodiments, may allow a supervisor or other user to track the activities of individual workers and/or work crews and compare the performance of particular workers. For instance, the example table 400 may be used to identify effective and/or ineffective workers by showing that Paul has a higher number of hits in comparison to nails fired than Sean.

In some embodiments, alerts may be generated and/or areas of table 400 may be emphasized. According to certain embodiments, alerts may be generated at a user interface if a project is estimated to finish after the deadline, as with the example in rows 426 and 428 of table 400. In certain embodiments, a processor (e.g., processor 112 or 206) may determine that the number of hits or misses in comparison to nails fired for one or more workers is above or below a threshold. In some embodiments, the determination may occur as a series of multiple value comparisons over a predetermined period of time. In certain embodiments, the determination may be a single value comparison. The threshold value may be a default setpoint or may be input and/or updated by a third party (e.g., manufacturer, user, or maintenance group). In some embodiments, if the processor determines that the number of hits in comparison to nails fired is below the threshold, an alert may be displayed at a user interface and, in certain embodiments, a supervisor or user viewing table 400 may choose to send an alarm and/or a kill signal to the device associated with that individual.

Modifications, additions, or omissions may be made to the systems described herein without departing from the scope of the invention. The components may be integrated or separated. While the disclosure above describes a particular embodiment of system 100, one of skill in the art would appreciate that many changes could be made to the assembly and still be within the scope of the present disclosure. For example, although this disclosure may discuss a roofing embodiment, it is contemplated that the disclosed system may be used in other fields of construction and manufacturing. This table may be reconfigured to closely match the business of an operator or a type of construction job. For instance, although table 400 depicts the number of nails fired as an operation of a device, reports may be generated for other operations and/or other devices. Furthermore, although table 400 illustrates values for nails fired and missed, this disclosure contemplates that table 400 may display any information collected at a server (e.g., server 116) or determined by one or more processors (e.g., processors 112 or 206). In some embodiments, table 400 may be displayed on user interface 122 of FIG. 1. Moreover, table 400 may depict more, fewer, or other elements.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A system comprising:
   a memory configured to store a plurality of acoustic profiles associated with one or more operations of one or more first devices, wherein the one or more first devices are nail guns and wherein the one or more operations include at least shooting a nail, the plurality of acoustic profiles comprising at least two of the following acoustic characteristics: frequency, amplitude, and time;
   one or more second devices attached to the one or more first devices, wherein each of the one or more second devices modify the one or more first devices to have an identifiable acoustic characteristic when operated and wherein the identifiable acoustic characteristic is associated with an individual operator; and
   one or more processors, at least one communicatively coupled to the memory and at least one communicatively coupled to an acoustic sensor, configured to:
      receive, from the acoustic sensor, a plurality of acoustic signals comprising one or more of the frequency and amplitude, wherein the acoustic sensor is one from the set comprising: communicatively coupled to a mobile communications device and integrated into a mobile communications device;
      compare the received acoustic signals to one or more of the acoustic profiles;
      determine that the one or more of the received acoustic signals match one or more of the acoustic profiles based on the comparison of the received acoustic signals to the acoustic profiles;
      monitor a number of the received acoustic signals that are determined to match one or more of the acoustic profiles;
      monitor the progress of a roofing project based at least in part on the monitored number of acoustic signals that are determined to match one or more of the acoustic profiles; and generate a progress report of the progress of the roofing project based at least in part on the monitored number of acoustic signals that are determined to match one or more of the acoustic profiles, wherein the generated progress report is accessible from a mobile communications device; and generate a performance report of the performance of an individual operator based at least in part on the monitored number of acoustic signals that are determined to match one or more of the acoustic profiles associated with the individual operator, wherein the generated performance report is accessible from a mobile communications device.

2. A system comprising:

a memory configured to store a first acoustic profile associated with a first device, wherein the first device is a nail gun, the first acoustic profile comprising at least two of the following acoustic characteristics: frequency, amplitude, and time, wherein the first acoustic profile is associated with an operation of the first device;

a second device attached to the first device, wherein the second device modifies the first device to have an identifiable acoustic characteristic when operated, wherein the identifiable acoustic characteristic is associated with an individual operator; and one or more processors, at least one communicatively coupled to the memory and at least one communicatively coupled to an acoustic sensor, configured to:
 receive, from the acoustic sensor, an acoustic signal comprising one or more of the frequency and amplitude;
 compare the received acoustic signal to the first acoustic profile;
 determine that the received acoustic signal matches the first acoustic profile based on the comparison of the received acoustic signal to the first acoustic profile;
 generate a progress report of the progress of a roofing project based at least in part on the received acoustic signal that is determined to match the first acoustic profile, wherein the generated progress report includes an indication of an amount of time to complete the roofing project, and wherein the generated progress report is accessible from a mobile communications device; and
 generate a performance report of the performance of an individual operator based at least in part on the received acoustic signal that is determined to match the first acoustic profile associated with the individual operator, wherein the generated performance report is accessible from a mobile communications device.

3. The system of claim 2, wherein:

the memory is further configured to store a second acoustic profile associated with a first operation of the first device, the second acoustic profile comprising at least two of the following acoustic characteristics: frequency, amplitude, and time;

the one or more processors further configured to:
 compare the received acoustic signal to the second acoustic profile; and
 determine that the received acoustic signal matches the second acoustic profile based on the comparison of the received acoustic signal to the second acoustic profile.

4. The system of claim 3, wherein:
the one or more processors further configured to:

receive a plurality of acoustic signals; and
 monitor a number of acoustic signals that are determined to match the first operation of the first device.

5. The system of claim 4, wherein the one or more processors are further configured to monitor the progress of the roofing project based at least in part on the monitored number of acoustic signals that are determined to match the first operation of the first device.

6. The system of claim 5, where the one or more processors are further configured to estimate an amount of time to complete the roofing project based at least in part on the monitored number of acoustic signals that are determined to match the first operation of the first device.

7. The system of claim 3, where the second acoustic profile is the first acoustic profile.

8. The system of claim 3, wherein the first operation of the first device is shooting a nail from the nail gun through a first set of materials, wherein the first set of materials includes one or more layers of roofing material.

9. The system of claim 3, wherein the first operation of the first device is associated with a safety problem.

10. The system of claim 9, wherein the one or more processors are further configured to generate an alarm signal in response to determining that the received acoustic signal matches the first operation of the first device.

11. The system of claim 4, wherein:

the memory is further configured to store acoustic profiles for at least one from the set comprising: a plurality of devices and a plurality of operations for at least one of the plurality of devices;

the one or more processors are further configured to:
 compare the received acoustic signals to at least one of the acoustic profiles from at least one from the set comprising: a plurality of devices and a plurality of operations for at least one of the plurality of devices;
 determine that the received acoustic signals match at least one of the acoustic profiles from at least one from the set comprising: a plurality of devices and a plurality of operations for at least one of the plurality of devices; and
 monitor a number of acoustic signals that are determined to match at least one of the acoustic profiles from at least one from the set comprising: a plurality of devices and a plurality of operations for at least one of the plurality of devices.

12. The system of claim 4, wherein the one or more processors are further configured to generate a matching report of the number of acoustic signals that are determined to match the first operation of the first device.

13. The system of claim 12, wherein the matching report is stored and operable to be accessed by a mobile communication device.

14. The system of claim 12, wherein the one or more processors are configured to generate the matching report in real time with the determination that the received acoustic signal matches the second acoustic profile based on the comparison of the received acoustic signal to the second acoustic profile.

15. The system of claim 2, wherein the acoustic sensor is one from the set comprising: communicatively coupled to a mobile communications device and integrated into a mobile communications device.

16. The system of claim 4, wherein the one or more processors are further configured to associate the monitored number of acoustic signals that are determined to match the first operation of the first device with an individual operator.

17. The system of claim 2, wherein the second device is associated with an individual operator.

18. The system of claim 6, wherein the one or more processors are further configured to:
   receive one or more from the set comprising: weather forecast data, supply chain data, employee schedule data, and employee performance data; and
   estimate the amount of time to complete the roofing project based at least in part on at least one from the set comprising: weather forecast data, supply chain data, employee schedule data, and employee performance data.

19. The system of claim 4, wherein the one or more processors are further configured to estimate an amount of inventory consumed based at least in part on the determination that the received acoustic signal matches the second acoustic profile based on the comparison of the received acoustic signal to the second acoustic profile.

\* \* \* \* \*